T. W. WOOD.
MACHINE FOR FORMING GLASSWARE.
APPLICATION FILED NOV. 21, 1905.

933,939.

Patented Sept. 14, 1909.
5 SHEETS—SHEET 1.

Witnesses
Inventor Thomas W. Wood,
By Victor J. Evans
Attorney

T. W. WOOD.
MACHINE FOR FORMING GLASSWARE.
APPLICATION FILED NOV. 21, 1905.

933,939.

Patented Sept. 14, 1909.
5 SHEETS—SHEET 2.

T. W. WOOD.
MACHINE FOR FORMING GLASSWARE.
APPLICATION FILED NOV. 21, 1905.

933,939.

Patented Sept. 14, 1909.
5 SHEETS—SHEET 4.

T. W. WOOD.
MACHINE FOR FORMING GLASSWARE.
APPLICATION FILED NOV. 21, 1905.

933,939.

Patented Sept. 14, 1909.
5 SHEETS—SHEET 5.

Witnesses
Wm. J. Koenth.
Frances L. M. Truv.

Inventor
Thomas W. Wood,
By Victor J. Evans
Attorney

UNITED STATES PATENT OFFICE.

THOMAS W. WOOD, OF ANDERSON, INDIANA.

MACHINE FOR FORMING GLASSWARE.

933,939.

Specification of Letters Patent. Patented Sept. 14, 1909.

Application filed November 21, 1905. Serial No. 288,447.

*To all whom it may concern:*

Be it known that I, THOMAS W. WOOD, a citizen of the United States, residing at Anderson, in the county of Madison and State of Indiana, have invented new and useful Improvements in Machines for Forming Glassware, of which the following is a specification.

The invention relates to an improvement in machines for forming glass ware, and particularly to a device adapted for initially forming, blowing and finishing hollow ware, such as bottles or jars.

The main object of the present invention is the production of a machine of the type described constructed and arranged to be entirely automatic in action, requiring neither manual control nor adjustment after the initial severance of the metal and its deposit within a blank mold, whereby the use of expert assistance required in the manipulation of the metal in forming articles of this kind is dispensed with, and the product of the machine is uniform in all respects.

Another object of the invention is the provision of an automatically operated device normally inactive and automatically controlled in the operation of the machine to be moved into coöperation with the initially formed article at an exact and predetermined time in its course of manufacture.

Another object is the provision of means for so operating the forming molds as to provide for the accurate reception and retention of the article during its initial formation and to automatically release the same at the completion of the blowing operation.

Another object of the invention is the provision of means whereby the mold table is intermittently rotated to properly aline and position the molds thereon with respect to the particularly desired coöperating mechanism, whereby to insure the continuous coöperation of said mechanism in definitely spaced periods of time whereby the uniformity of the product is assured and the shunting of the material prevented.

With the above objects in view the invention consists in certain details of construction and combination of parts to be particularly described in the following specification, wherein reference is had to the accompanying drawings, in which:—

Fig. 2 is a side elevation of the same, Fig. 3 an enlarged sectional detail, partly in elevation illustrating particularly the mechanism for initially depositing the metal in the blank mold, Fig. 4 a detail sectional view partly in elevation illustrating the position of the parts immediately preceding the operation of the blowing device, Fig. 6 is a plan of one of the neck forming molds, Fig. 7 a transverse section of the same, Fig. 8 a view in elevation partly in section illustrating the mechanism for automatically controlling the operation of the various parts, Fig. 9 a broken section showing the connection of the clutch disk, Fig. 10 a bottom plan illustrating the table feed, Fig. 11 a sectional view transverse the table illustrating the stop mechanism therefor, Fig. 12 a vertical sectional view illustrating particularly the coöperation of the blowing mechanism with the mold, Fig. 13 a perspective detail illustrating the stop mechanism for the mold table, Fig. 14 is a vertical section partly in elevation illustrating a forming tool for the neck of the articles.

Figure 1:
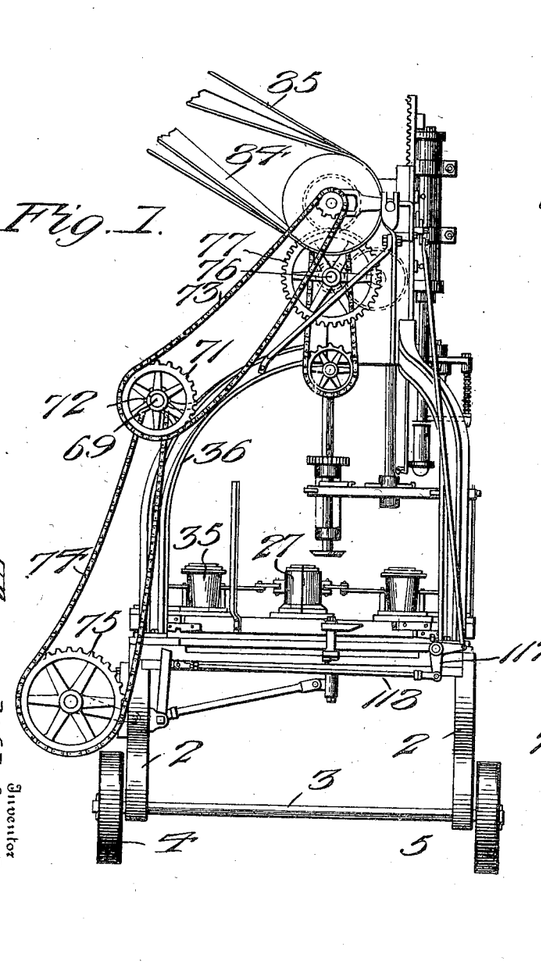
Figure 1 is an end elevation of a machine constructed in accordance with my invention.
Figure 2:
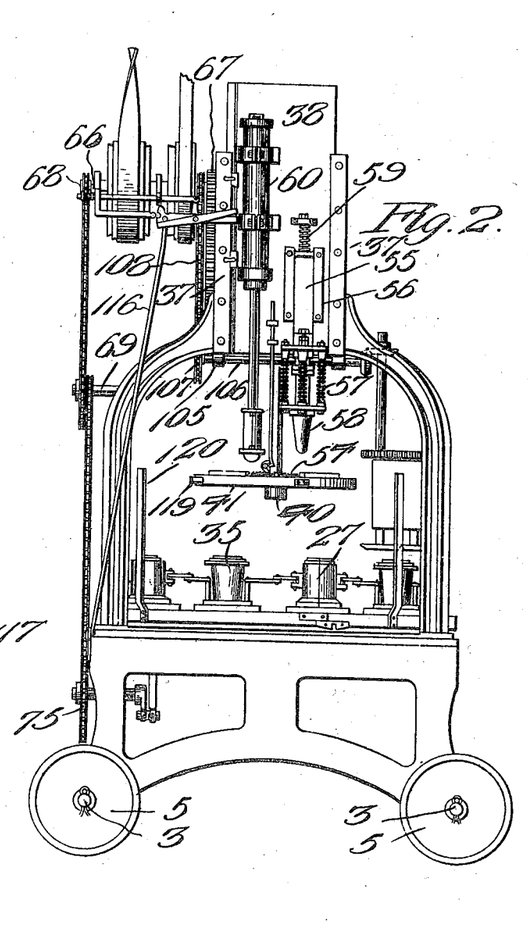
Figure 10:
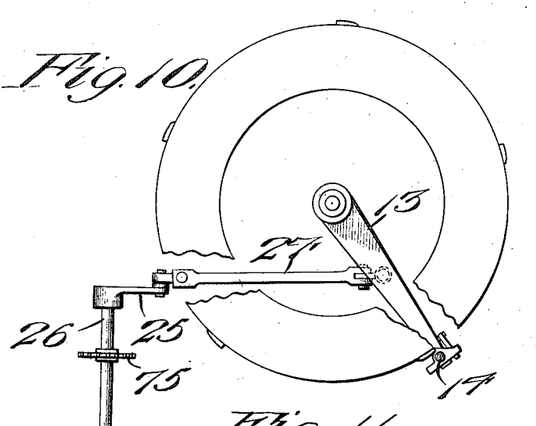

Referring to the drawings my improved machine is supported upon a suitable base 1, preferably comprising a rectangular plate from which depends side frames 2, revolubly supporting at their lower ends transversely arranged parallel shafts 3 and carrying supporting wheels 4, whereby the machine as a whole may be conveniently moved from place to place, as desired. The base plate 1 is centrally apertured at 6 for the reception of the pivot pin 7 depending from the mold table 8, preferably of annular or ring shape form and adapted for intermittent rotation on the base plate, as hereinafter described. The base plate is centrally recessed to provide an annular peripheral shoulder 9 on which is supported an annular bearing plate 10 designed to underlie the mold table, said bearing plate and table being formed with coöperative ballways 11 for the reception of balls 12, whereby the table is adapted for movement with a minimum of friction. With particular reference to Figs. 1 and 10 it will be noted that the table is intermittently revolved through the medium of an arm 13 journaled on the pivot pin 7 immediately above the base plate, and terminating in its free end beyond the periphery of the table 8.

Figure 11:
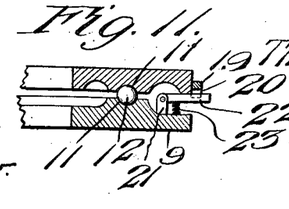
Figures 13, 14:
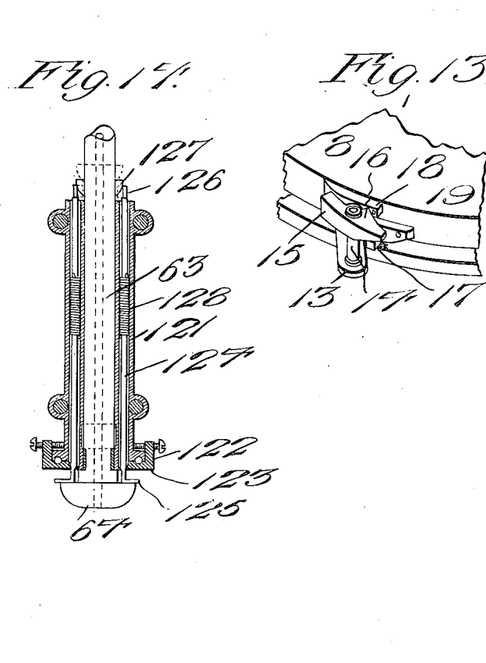

The outer end of the arm is provided with a vertically projecting stud 14, on which is pivotally mounted a dog 15, the edge of which next the table is formed with an offset or shoulder 16. The end surface of the dog adjacent the end opposite its direction of movement is upwardly inclined at 17, for a purpose hereinafter described. The table proper is formed with a series of projecting blocks 18, corresponding in number to the number of molds on the table and immediately below each of said blocks with a stop 19, formed on its lower edge with a shoulder 20 to project below the lower surface of the table. The bearing plate 9 is provided with a vertically projecting arm 21 adjacent its peripheral edge in which is mounted the inner end of a lever 22, spring pressed in an upward direction through the medium of a coil spring 23 bearing between said lever and the surface of the bearing plate. Under the normal influence of the spring the free end of the lever projects beyond the free end of the table in position to engage the shoulder 20 of the stops 19 and thereby arrest further movement of the table. The arm 13 is connected to one end of a pitman 24, the opposite end of which is connected to a crank 25 secured upon the end of a shaft 26, which is intermittently operated in a manner to be later described. By this construction the arm 13 is reciprocated through a predetermined path, serving in its coöperative movement to cause the incline 17 of the dog 15 to ride over and depress the free end of a lever 22 from the stop 19, the movement of the arm 13 continuing until the shoulder 16 of the dog is positioned in rear of the block 18. The table is thus free for movement and a lever operation of the arm 13 will draw the table about its pivot pin until the next successive stop 19 is engaged by the lever 22, when the motion of the table is arrested and the successive mold thereon properly positioned for operation.

The table 8 is designed to fixedly support relative thereto a plurality of molds 27, hereinafter termed formers, five being shown in the present instance, equally spaced circumferentially of the table. The molds are of the hinge type, each including two sections hinged together and are adapted to be opened and closed through identical mechanism. The operating mechanism for the mold sections comprises a toggle lever 28 connected to each section of the mold, and each of said levers are connected at their joints to one end of the lever 29. The opposite end of said rods are both connected to a pin 30, depending therefrom and guided in operation by a lever 31 connected to said pin and pivotally secured at its opposite end in a plate 32 secured to and projecting inwardly from the table 8. Fixed to the base plate 1 and lying within the central opening of the table is a cam disk 33, formed with a cam groove 34 and in which is seated the lower ends of the pin 30 of each of the mold operating devices, the cam groove being so arranged that at predetermined points in the path of travel said mold sections will be operated to open or close the mold as desired at the particular point. Intermediate the molds 27 are arranged cup-shaped receptacles, hereinafter termed blanks 35, serving for the initial reception of the molten metal, as is usual in bottle making machines. The blanks are equally spaced between the adjacent formers and serve as charging molds from which the metal is transferred to the formers in the operation of the machine.

The base 1 supports a suitable framework comprising standards 36, preferably any number extending upward from each corner of the base, and supporting at their upper ends the operating mechanism to be later described. By preference the standards 36 are of such length and so curved as to position the operating mechanism above one portion of the table rather than centrally above the same.

Figure 5:
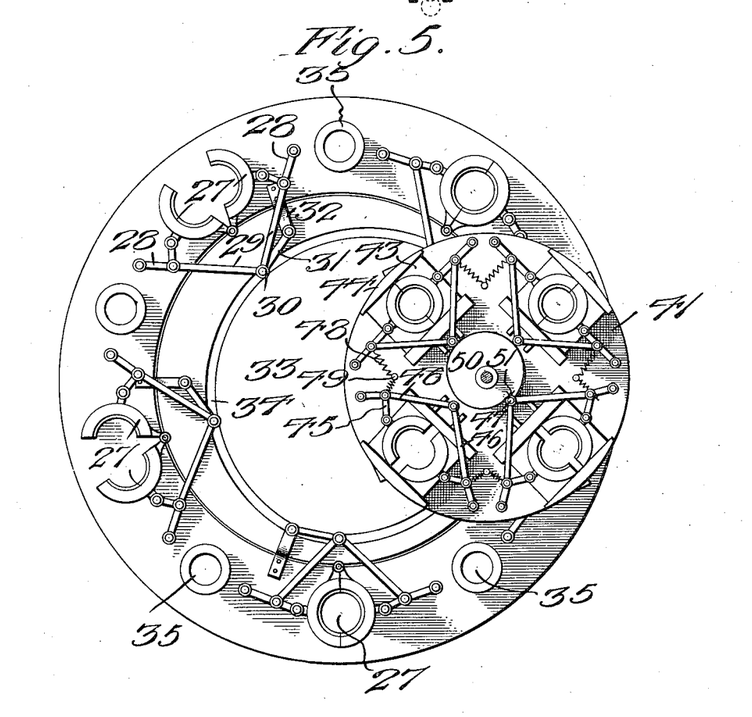
Fig. 5 is a plan illustrating the relative arrangement of the mold table and neck forming mold support.
Figure 6:
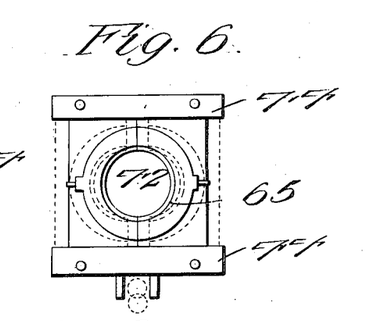
Figure 7:
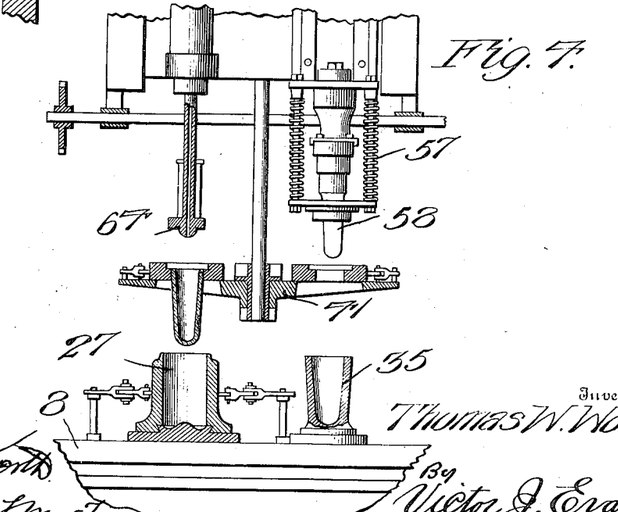

Supported at the upper ends of the standards are guides 37 spaced apart to receive and guide a slide plate 38, arranged to carry the plunger and blowing device. Depending from this plate is a rod 39, provided at its lower end with a stop or collar 40 and adapted to slidably and revolubly support the neck-mold carriage or table 41. The table 41 is of disk like form of less diameter than the main table and supports on the surface thereof a series of neck molds or liftovers. These molds shown as four in number for the present construction are made in two independent sections 42—43 slidably mounted in guides 44 secured upon the table 41. The liftover mold is suitably provided with a central opening having the configuration of wall desired to be produced in the finished bottle. Each of the liftovers is actuated by similar mechanism, comprising toggle levers 45 secured at one end to the table and at the opposite end to one of the mold sections, the joint of the levers being connected to rods 46 which, at their inner terminals, are pivotally connected together and are provided with a roller 47 at the juncture. A spring 48 is connected to the joint of the toggle levers 45 and to a fixed stud 49 on the table, said springs being primarily adapted to maintain the toggle levers in broken position, whereby the liftover sections are separated. Rotatably supported upon the rod 39 is a cam 50, having an eccentric or cam peripheral edge formed at a determinate point with a depression 51. The cam is freely movable about the rod and is operated through the medium of a trip 52 depending from the slide plate and formed at its lower end to engage a dog 53 pivotally supported on the rod 39 and engaging with a circumferential row of teeth 54 formed on the cam surface.

The plunger comprises a bar 55 slidably held in guides 56 fixed on the face of the slide plate 38, and carrying at their lower end the usual plunger head 57, supporting a plunger 58 of any desired or preferred form. The upper end of the bar 55 is maintained in depressed or lowered position through the medium of a coil spring 59 encircling a guide rod projecting from the bar 55 and guided in a projection from the slide bar 38, the spring bearing between the bar 55 and the projection. The main function of the spring is to permit the necessary yielding movement of the plunger in the event of an excess of glass in the blank molds.

Figure 12:
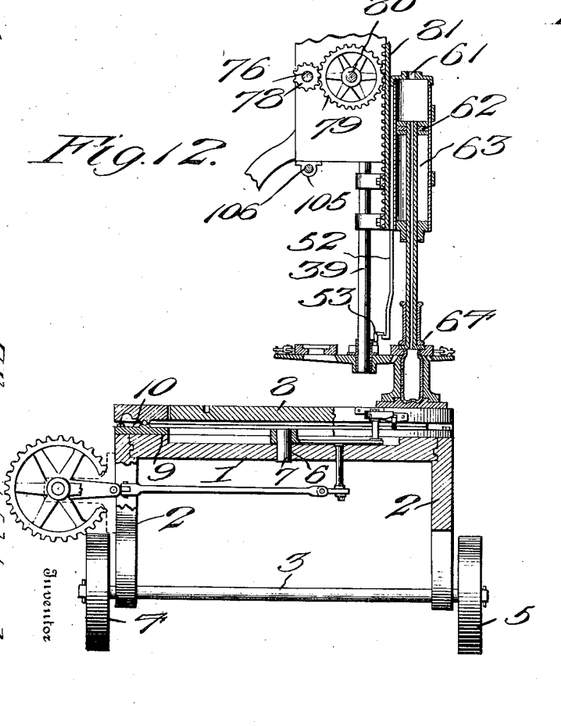

The blowing device comprises a cylinder 60 secured to the slide plate 38, and in communication at its upper end with the atmosphere, as at 61, said opening being, however, closed by an ordinary valve to permit ingress of the air but prevent egress thereof. A plunger 62 is mounted for movement within the cylinder, being connected to the upper end of a hollow plunger or piston rod 63, which extends below the cylinder and is provided with a suitable head 64 designed to seat within a recess 65 in the liftover when the parts are in operative position. The piston rod is in open communication with the space above the piston, so that on a downward movement of the cylinder the air normally above the piston will be forced through the piston rod and utilized for distending the bottle. It is at once obvious that independent means must be provided for operating the several parts, whereby the main table may be revolved while the plunger and blower are inoperative, and said latter parts operated while the main table is at rest. To secure this operation I have provided means by which the main table is intermittently fed, the operating mechanism during the periods of rest of the table being utilized for operating the slide plate.

Figure 8:
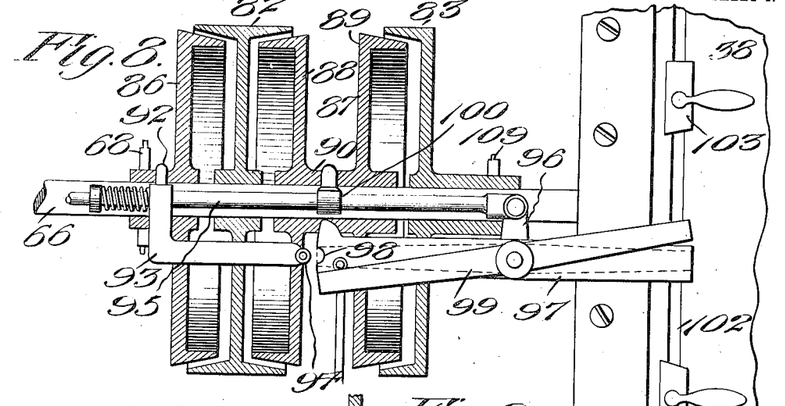

The operating mechanism comprises a shaft 66 supported in suitable bearing blocks fixed on the upper ends of the standards said shaft extending parallel to and in rear of the slide plate 38. Immediately adjacent one edge of the slide plate the shaft is provided, as hereinafter described, with a relatively movable gear 67 and near the free end of the shaft adjacent the gear 67 is arranged a sprocket wheel 68. A stub shaft 69 is mounted below the main shaft and provided with a large and a small sprocket 71 and 72. A sprocket chain 63 connects the sprockets 68 and 71, while a second chain 74 operatively connects the sprocket 72 with a sprocket 75 fixed on the main table operating shaft 26. Immediately below the main shaft 66 is mounted an auxiliary shaft 76, carrying a large gear 77 at all times in mesh with the gear 76 on the main shaft. Between the bearing blocks supporting the main shaft the shaft 76 is provided with a pinion 78, arranged to mesh with a gear 79 mounted upon an auxiliary shaft 80 secured between the bearing blocks in horizontal alinement with and forward of the shaft 76. The gear 79 is adapted to operate the slide plate 38, being arranged to engage a rack bar 81 secured upon the rear face of said plate. It is therefore obvious that the main shaft through the medium of the sprockets 68 and connected parts will operate the main table feeding mechanism, while through the gears 67, 77, 78, 79 and the rack 81 will reciprocate the slide plate 38. It is at once apparent, however, that means must be provided for operating one of the parts while the other is at rest, or more properly speaking to operate the table while the slide plate 38 is being withdrawn to inoperative position, and to operate the slide plates in a downward direction while the table is at rest. In effecting this result I provide two cone pulleys 82 and 83, the former being of the double hollow cone type and the latter of the single hollow cone type, the pulley 82 being driven by a cross belt 84 and the pulley 83 by a direct belt 85, deriving power from any suitable continuously operated line shaft.

Figure 9:
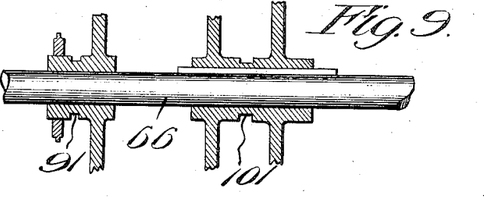

The pulleys 82 and 83 are loose upon the main shaft and are driven through a suitable clutch mechanism comprising a single clutch disk 86 and a double clutch disk 87 including duplicate and oppositely disposed clutch wheels 88 and 89, mounted upon a single sleeve 90 arranged to be keyed upon the main shaft. The clutch wheels are of the friction type designed to engage the cone shaped interior surface of the belt wheel. The cone wheel 86 is arranged to engage one face of a double pulley 82, while the cone wheel 88 of the double clutch is arranged to engage the opposite face of the double wheel, the supplemental clutch wheel of the double clutch being arranged to engage the single belt wheel 83. The sprocket 68 is arranged upon a projecting sleeve of the single clutch wheel 86, and of course will be driven when said clutch is in engagement with the double belt wheel 82.

The sleeve of the single clutch 86 is circumferentially recessed at 91 to receive a yoke 92 connected with an arm 93 extending transversely beyond the periphery of the wheel and terminating in a roller 94. The arm 93 is mounted for movement on a shaft 95 arranged in parallel relation with the main shaft and suitably guided for longitudinal movement relative thereto. The end of the shaft 95 next the slide plate 38 is provided with a crank 96, connected to and operated by a lever 97, the forward end of which extends in proximity to the roller 94 on the end of arm 93, and is provided with a recess 98 to receive said roller. An operating lever 99 is pivotally secured upon the lever 97 with its forward end so arranged that in one position of said lever the recess 98 will be closed against the entrance 94, the parts being so arranged that when said lever 99 is in position to uncover the recess 98 the inner end of said lever is in a plane above or below the inner end of the main lever 97. The slide shaft 95 is provided with a yoke 100 designed to movably embrace a circumferential recess 101 formed in the sleeve connecting the friction clutch wheels 88 and 89 of the double clutch 87. A rod 102 is connected in longitudinal alinement with the slide plate 38, on which rod stops 103, 104 are mounted, preferably comprising blocks slidably engaging the rod and held in adjusted relation through the medium of any suitable clamping mechanism.

Figure 3:
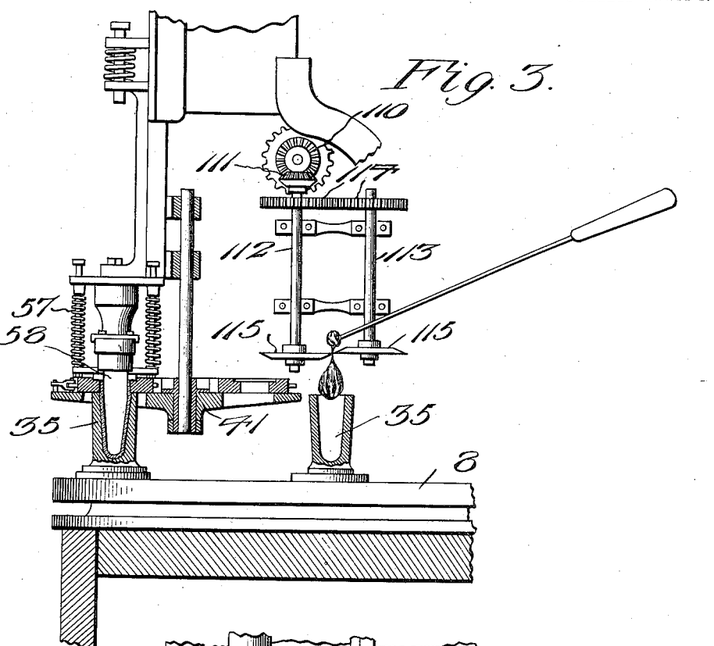

Hangers 105 are supported from a fixed part of the machine in rear of the slide plate serving to support a shaft 106 to operate the cutting mechanism. At the end of the shaft underlying the main shaft, a sprocket wheel 107, connected by a sprocket chain 108 to a sprocket wheel 109 fixed upon the extended sleeve of the single belt pulley 83, so that said shaft 106 is continuously operated. The shaft 106 extends to a position overlying the charging end of the machine, being there provided with a bevel gear 110 arranged to engage with a gear 111 fixed upon the upper end of a cutter shaft 112, a second cutter shaft 113 being arranged in spaced parallel relation with the shaft 112. The shafts are driven respectively in reverse directions through the medium of connecting gears 114, and are each provided at their lower ends with cutting disks 115, of such size that their cutting peripheries are in close relation between the shafts 112 and 113.

To provide for manually controlling the operating mechanism I connect a rod 116 with the main lever 97 of said mechanism, said rod extending to the base plate of the machine and being there connected to a crank lever 117, the free end of which is connected to a bar 118, in the suitable operation of which the main lever 97 may be rocked similar to its movement under the influence of the stops 103 and 104 and thereby control the stops as desired. The auxiliary table 41 is provided with peripheral offsets 119, equal in number to the number of liftovers carried by said table and adapted to be contacted with and operated by rods 120 extending upwardly from the periphery of the main table 8.

It being desirable at times to provide a forming tool for use with the blower I have constructed my blowing apparatus to accommodate such combination. The tool is particularly illustrated in Fig. 14 wherein a sleeve 121 is adapted to surround the lower end of the plunger 63, being supported at its lower end in a head 122 in which it is preferably arranged for convenient movement through ball bearings 123. Shaping tools 124 project through suitable longitudinal openings in the sleeve, extending beyond the lower end of the same and there provided with shaping edges 125. The upper ends of the tools are provided with web ends 126, adapted to be operated by cam blocks 127 fixed on the piston rod 63. The webs have their surfaces next the plunger eccentrically disposed relative to the surface of the plunger, so that as the cam blocks 127 engage the inclined surfaces of the webs in the depressing of the plunger they will force said engaged portions from the surface of the plunger, thereby rotating the shaping tools 124 and turning the edges 125 into operative position. Coil springs 128 encircle the shaping tools and are adapted to return the parts of said tools to normal position upon the elevation of the plunger. By this construction any suitable groove or recess may be formed in the neck of the ware simultaneously with the operation of blowing.

With the parts constructed and arranged as described, the operation of my improved apparatus is as follows. Assuming that the slide plate 38 is at the extreme downward limit of movement, in which position the stop 103 has contacted with and shifted the levers 97 and 99 to cause frictional engagement of the clutch wheels 86 and 89 with the respective belt wheels 82 and 83. This movement causes a revolution of the sprocket 68 to operate the main table feeding mechanism and a revolution of the gear 79 to move the slide plate in the upward direction. The table is now fed a determinate distance to present one of the blank molds 35 beneath the shearing disks 115. The molten glass picked up on the end of the gathering tool is forced between said disks to permit the material to be cut off and dropped into the blank molds. The next feed of the table alines said blank molds with one of the liftovers of the auxiliary table. During the double feed of the table discharge the slide plate has descended and again moved upward, being at the extreme upward position when said molds are alined as stated. As the slide plate reaches its limit of upward movement the stop 104 contacts with the respective levers 97 and 99 disengaging the clutch wheels 86 and 89, and forcing the clutch wheel 88 into coöperation with the double belt pulley. This operation arrests the upward movement of the slide plate and disengages the table feeding mechanism, at the same time throwing the main shaft within the influence of the double belt pulley 82, whereby to reverse the operation of said shaft and cause the slide plate to move downward. This movement of the plate continues until the particular liftover mold then immediately below the plunger 58 is alined with the blank mold carrying the metal. After so positioning the liftover mold the slide plate continues to move downward forcing the plunger into the metal and initially shaping the ware, at the same time causing said liftover to grasp the upper end of the initially formed article. The parts now recede, incident to the reverse operation of the clutch wheels described. The article is lifted by the particular liftover of the auxiliary table from the blank mold and in the next feeding operation of the table is, through the engagement of the particular arm 120 with the particular offset 119 positioned above one of the adjacent forming molds, and at the same time in alinement with the blower. On the next descent the article is deposited within the particular forming mold and the blower descends into coöperation with the open end of said article and distends the same under the influence of the pressure. As the auxiliary table rises from this operation the stop 52 engaging the dog 53 will shift the cam 50 so as to cause the roller 47 on the particular liftover to ride into the offset 51 of the cam, thus permitting the springs 48 to open the liftovers and release the article, permitting the same to remain within the forming molds. The operation is continued until at a point approximately opposite the charging point the cam groove 34 in the cam 33 operates to open the particular forming mold 27 to permit discharge of the article.

It is of course to be understood that the operation is a continuous and successive one, that each of the blank molds is charged in succession, and that when the machine is in operation the operation of charging, initially forming, blowing, and discharging is being continuously and uninterruptedly performed.

The operation is automatic throughout, requiring no manual control, and by the adjustments provided, the machine is readily adapted for turning out perfect ware.

Having thus described the invention what is claimed as new, is:—

1. An apparatus for forming glass ware comprising a main table, press-molds and blow-molds carried by the table, means for intermittently operating said table, an auxiliary table mounted above the main table, means carried by the main table for moving the auxiliary table during movement of the main table, and means for feeding said auxiliary table to and from the main table to transfer articles from the press-mold to the blow-mold.

2. A machine for forming glass ware comprising a main table, press-molds and blow-molds carried by the table, means for intermittently moving said table, an auxiliary table mounted above the main table, means carried by the main table for moving the auxiliary table during movement of the main table, and means for feeding said auxiliary table toward the main table during the periods of rest of said table, and means carried by the auxiliary table for transferring the articles from the press-mold to the blow-mold of the main table.

3. A machine for forming glass ware comprising a main table, an auxiliary table mounted above the main table, a continuously driven power means, means intermediate said power means and tables whereby to intermittently feed the main table and continuously reciprocate the auxiliary table in both directions, said means operating to hold the main table at rest while the auxiliary table is moving in one direction, and means carried by the main table for rotating the auxiliary table.

4. A machine for forming glass ware comprising a main table, an auxiliary table mounted above the main table, a continuously driven power means, and means intermediate said power means and tables whereby to intermittently feed the main table and continuously reciprocate the auxiliary table, said feeding means being automatically controlled by the movement of the auxiliary table.

5. A machine for forming glass ware comprising a framework, a main table rotatably mounted thereon, a plate slidably supported in the framework and movable to and from the main table, an auxiliary table revolubly supported by the plate, and means for intermittently revolving the main table and reciprocating the slide plate, said means being automatically controlled by the plate.

6. A machine for forming glassware, comprising a main table, forming molds and blank molds carried by said table, an auxiliary table mounted above the main table and adapted for reciprocation relative to said table, liftover molds carried by the auxiliary table, a plunger for initially forming the glassware, and a blower for completing the ware, said liftover molds engaging to elevate the article intermediate operations of the plunger and blower, said plunger and blower being reciprocated with the auxiliary table.

7. A machine for forming glassware, comprising a main table, forming molds and blank molds carried by said table, an auxiliary table mounted above the main table and adapted for reciprocation relative thereto, liftover molds carried by the auxiliary table, means for operating the liftover molds, means automatically actuated in the reciprocation of the auxiliary table for insuring actuation of the liftover mold operating means, a plunger for initially forming the glassware, and a blower for completing the ware, said plunger and blower being carried with the auxiliary table during its reciprocation.

8. A machine for forming glassware comprising a framework, a main table revolubly supported thereon, forming molds and blank molds carried by the table, means for intermittently feeding the table, a slide plate carried by the framework, means for reciprocating the slide plate, an auxiliary table carried by the slide plate and arranged parallel to the main table, a blower carried by the slide plate and arranged to coöperate with one of the molds on the main table, and means to create pressure within the blower through the operation of the slide plate.

9. A machine for forming glassware comprising a framework, a main table rotatably mounted thereon, a plate slidably supported in the framework, means for reciprocating the slide plate relative to the table, a continuously driven power means, an actuating shaft for the machine, a direct belt leading from the power means to the shaft for actuating the slide plate in one direction and intermittently feeding the table, a cross belt leading from the power means to the shaft for actuating the slide plate in the reverse direction, and clutch connections intermediate the respective belts and actuating shaft whereby when one belt is operatively geared to the shaft the other is free from effect upon the shaft.

10. A machine for forming glassware comprising a framework, a main table rotatably mounted thereon, a plate slidably supported in the framework, means for reciprocating the slide plate relative to the table, a continuously driven power means, an actuating shaft for the machine, a direct belt leading from the power means to the shaft for actuating the slide plate in one direction and intermittently feeding the table, a cross belt leading from the power means to the shaft for actuating the slide plate in the reverse direction, clutch connections between the respective belts and actuating shaft, and means carried by the slide plate for controlling said clutch connections.

In testimony whereof, I affix my signature in presence of two witnesses.

THOMAS W. WOOD.

Witnesses:
D. C. CHIPMAN,
BELLE C. MOORE.